Patented Mar. 17, 1925.

1,530,139

UNITED STATES PATENT OFFICE.

LONNIE W. RYAN, OF CHICAGO, ILLINOIS, ASSIGNOR TO LINDSAY LIGHT COMPANY, OF CHICAGO, ILLINOIS, A CORPORATION OF ILLINOIS.

ART OF MANUFACTURING ZIRCONIUM COMPOUNDS.

No Drawing.    Application filed May 23, 1923.    Serial No. 641,007.

*To all whom it may concern:*

Be it known that I, LONNIE W. RYAN, a citizen of the United States, residing at Chicago, in the county of Cook and State of Illinois, have invented a new and useful Improvement in the Art of Manufacturing Zirconium Compounds, of which the following is a specification.

The present invention relates to improvements in the art of manufacturing zirconium compounds, and will be fully understood from the following description, in which certain specific processes exemplifying the present invention are set forth in detail.

In accordance with the present invention, a suitable zirconium ore, such as Brazilian zirkite, is decomposed by treatment with sulfuric acid. Although it has hitherto been known to decompose such silicious zirconium ores with upwards of three times their weight of sulfuric acid, in accordance with my invention, acid in amount not more than twice the weight of ore is employed. The sulfuric acid used is preferably 100% acid. 100 parts of zirkite are charged into a cast iron pot with, say, 150 parts of sulfuric acid and the mixture is heated to 200 and 250° C. and maintained at such temperature (preferably about 225° C.) for about ten hours, preferably with continuous stirring. At the end of this period, the temperature is raised to 350 to 400° C. and this temperature is maintained for about two hours additional. The material (pot-cake) is permitted to cool at least to some extent, and is then added to from 700 to 800 parts of water, with which it is stirred, and, if desired, may be heated to the boiling point. The liquid is then filtered, the residue amounting to about 40 parts. About two-thirds of the zirconium contents of the ore goes into the filtrate, the remainder, with about an equal part of silica, forming the bulk of the residue. The further treatment of this residuum will be described hereinafter.

The filtrate, which contains excess sulfuric acid, is then neutralized with any suitable alkaline material, preferably one which forms an insoluble sulfate. As the neutralizing medium, I prefer to employ such materials as lime, calcium hydroxide, barium hydroxide etc., as the reaction products are substantially eliminated by precipitation from the zirconium-containing liquid. Too great an amount may not be employed, however, or part of the zirconium content of the liquid will be precipitated. The precipitate filtered out is a substantially pure sulfate, which is practically insoluble in the filtrate.

The zirconium may be immediately precipitated from the filtrate in the manner hereinafter set forth, although preferably the latter is subjected prior to precipitation to a reduction in order to convert any iron present into the ferrous condition. For example, to the sulfate, as above set forth, a sufficient quantity of a suitable reducing agent, for example, fourteen parts of sodium thiosulfate, may be added to effect this reduction.

In carrying out the precipitation in accordance with the present invention, the zirconium is thrown out in a granular form as a basic sulfate from an aqueous zirconium sulfate solution. In carrying out the precipitation, a suitable alkaline material is added to the solution until the zirconium is substantially completely precipitated as the basic sulfate, this addition of alkali taking place in the presence of certain auxiliary ions of strong electrical character, such as the strongly electro-positive potassium ion or the strongly electro-negative chloride ion.

In carrying out the precipitation, the auxiliary ion which is provided in accordance with the present invention and which causes the formation of a granular precipitate, may be added in proper proportion prior to the addition of the alkali which effects the precipitation of the zirconium, or it may be added simultaneously therewith. For example, in case of the use of a potassium compound, there may be added to the solution of the zirconium compound a suitable potassium salt, such as potassium sulfate, and this addition may be followed by an alkali such as sodium carbonate or caustic soda, the latter being added until the zirconium is substantially completely precipitated. The amount of the potassium compound employed should be sufficient to provide at least one-twentieth ($\frac{1}{20}$) mole for each mole of zirconium oxide ($ZrO_2$). Preferably sufficient to provide about one-eighth (⅛) to one-half mole is employed. When the potassium compound is added before the alkali, care must be taken, of course, that sufficient is not added to precipitate a double zirconium salt. By suitable preliminary tests upon a sample of the zirconium solution, a limiting amount may be readily determined. Instead of adding the potassium salt prior to the addition of the alkali, I may add it simultaneously therewith. For example, there may be added to the zirconium solution a solution containing both potassium salts and alkali; for example, potassium carbonate or potassium hydroxide admixed with sodium hydroxide, sodium carbonate, magnesium hydroxide or other alkalies which do not form insoluble sulfates. For example, in the case of the particular solution obtained from zirkite in the manner hereinbefore described, there may be added a 20% solution of equal parts of potassium carbonate and sodium carbonate until the zirconium is substantially entirely precipitated. As a rough practical test, the alkali may be added until the solution changes the color of yellow methyl orange test paper to only a faint pink.

The zirconium is thrown out of the solution as a white granular basic sulfate, which is easily washed by decantation and readily filtered. It is white, almost insoluble in water but is very soluble in dilute sulfuric and other acids. It hydrolizes readily during washing and the proportion of $SO_3$ to $ZrO_2$ varies from 35 to 41%. Under the conditions described, it is precipitated substantially free from iron when the latter is present in the ferrous condition. As hereinbefore stated, it is therefore preferable to reduce the iron present in the solution prior to effecting precipitation of the zirconium.

As pointed out in my co-pending application, Serial No. 641,008, filed of even date herewith, instead of the potassium ion other auxiliary ions of a strong electrical character, such as the chloride ion may be present to produce the granular basic sulfate of zirconium under the conditions described.

The basic sulfate precipitate thus removed is filtered, carefully washed and may be subjected to further treatment as desired; for example, it may be ignited directly to the oxide or may be converted to the hydroxide, for example, by thorough agitation with a cold aqueous solution of substantially the theoretical amount of an alkali such as sodium hydroxide. The filtrate, which usually contains a small amount of zirconium, is pumped into a tank and zirconium is precipitated by the addition of a sodium carbonate, a small amount of iron being likewise thrown out. This impure precipitate is filtered out and, being soluble in sulfuric acid, is added to a subsequent run of pot-cake resulting from digestion of zirkite prior to the removal of the zirconium sulfate therefrom by digestion with water.

The insoluble residue from the pot-cake (amounting to about forty parts) may be ignited, thereupon losing from two to three per cent of its weight, and the resulting ignited product contains about equal parts of zirconium oxide and silica. It may be employed in the ceramic arts, or may be directly employed in the manufacture of refractory articles, by the use of suitable bonding agents, or by direct fusion.

Although the present invention has been described in connection with certain specific details of methods for carrying it into effect, it is not intended that these shall be regarded as limitations upon the scope of the invention except in so far as included in the accompanying claims.

I claim:

1. The method of manufacturing zirconium compounds which comprises decomposing a silicious zirconium ore with not more than twice its weight of sulfuric acid, neutralizing the free acid in the resulting solution, precipitating a granular basic zirconium sulfate from said solution and separating the precipitated granular basic sulfate.

2. The method of manufacturing zirconium compounds which consists in decomposing zirkite with not more than twice its weight of sulfuric acid, dissolving the soluble constituents from the resulting mass with water, separating the solution from the undissolved residue, neutralizing the free acid in the solution, precipitating granular basic zirconium sulfate therefrom, separating the precipitated basic sulfate, precipitating residual zirconium from the remaining solution and adding the last precipitated zirconium to decomposed zirkite mass prior to treatment thereof with water.

3. In the method of manufacturing zirconium compounds, the step of producing a granular basic zirconium sulfate which comprises adding an alkali to an aqueous zirconium sulfate solution while providing therein an auxiliary potassium ion.

4. In the method of manufacturing zirconium compounds, the step of preparing a granular basic zirconium sulfate which comprises adding an alkali to an aqueous zirconium sulfate solution while providing therein a soluble potassium compound in the proportion of at least one-twentieth mole for each mole of zirconium oxide.

5. In the method of manufacturing zirconium compounds, the step of preparing a granular basic zirconium sulfate which consists of adding to an aqueous zirconium sulfate solution a solution of a mixture of a potassium salt and an alkali.

6. In the method of manufacturing zirconium compounds, the step of preparing a granular basic zirconium sulfate which comprises adding to an aqueous solution of zirconium sulfate a solution of potassium and sodium carbonates in equal proportions.

7. In the method of manufacturing zirconium compounds, the steps of preparing a substantially iron-free granular basic zirconium sulfate which comprises reducing an aqueous iron containing zirconium sulfate solution and adding an alkali thereto while providing in said solution potassium ions.

8. In the method of manufacturing zirconium compounds, the step of decomposing a silicious zirconium ore which consists in heating such ore with not more than twice its weight of sulfuric acid to a temperature of 200 to 250° C. for about ten hours and subsequently raising the temperature to 350 to 400° C. for about two hours.

LONNIE W. RYAN.